March 3, 1964 R. H. SHIMWELL ETAL 3,122,940
ELECTRICAL SELECTION APPARATUS OR SYSTEMS
Filed Nov. 4, 1959 4 Sheets-Sheet 1

INVENTORS
Rodney Hayden Shimwell
Edward Lettman Robinson
By Watson Cole, Grindle & Watson

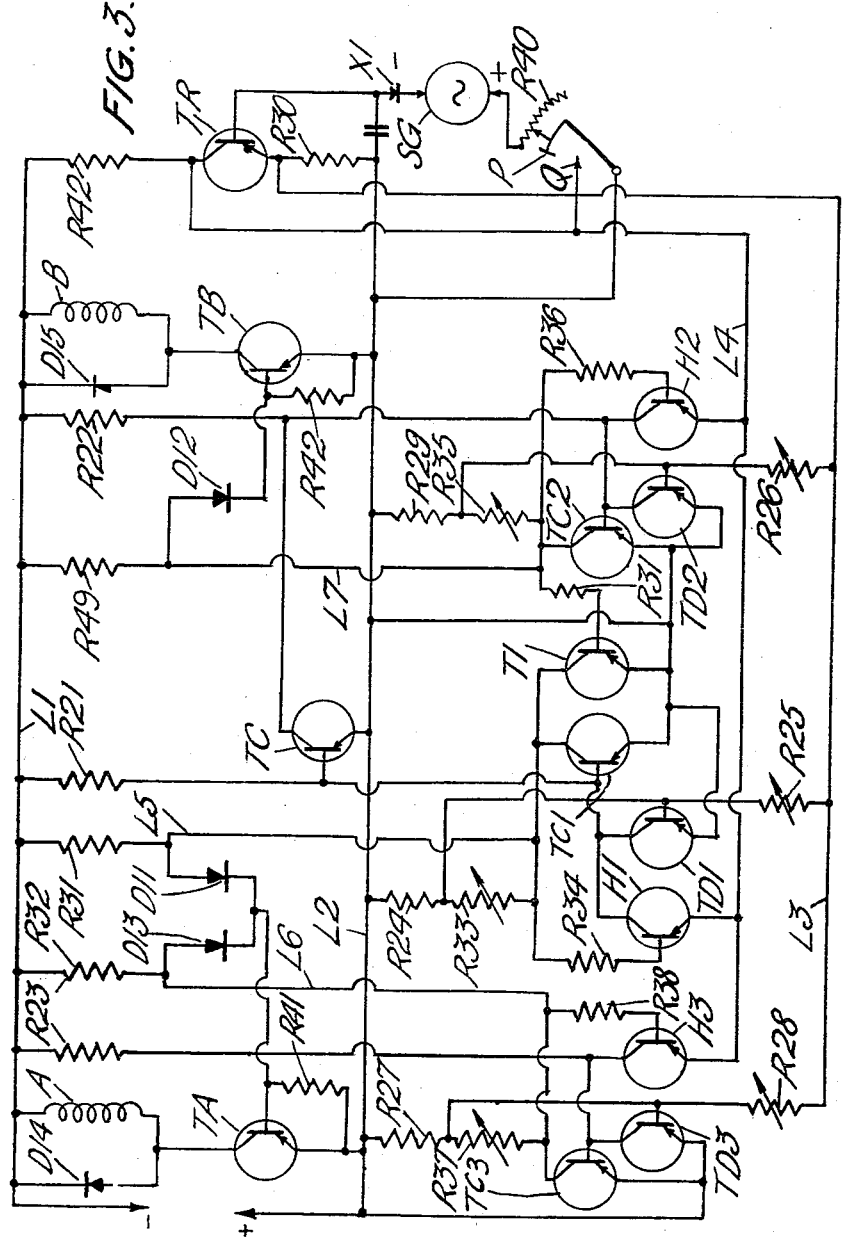

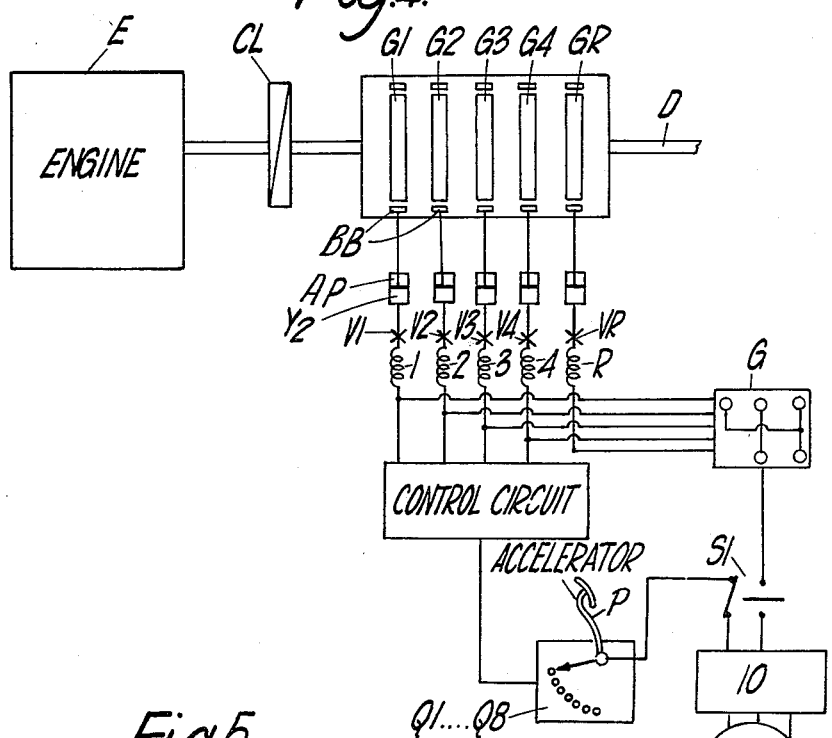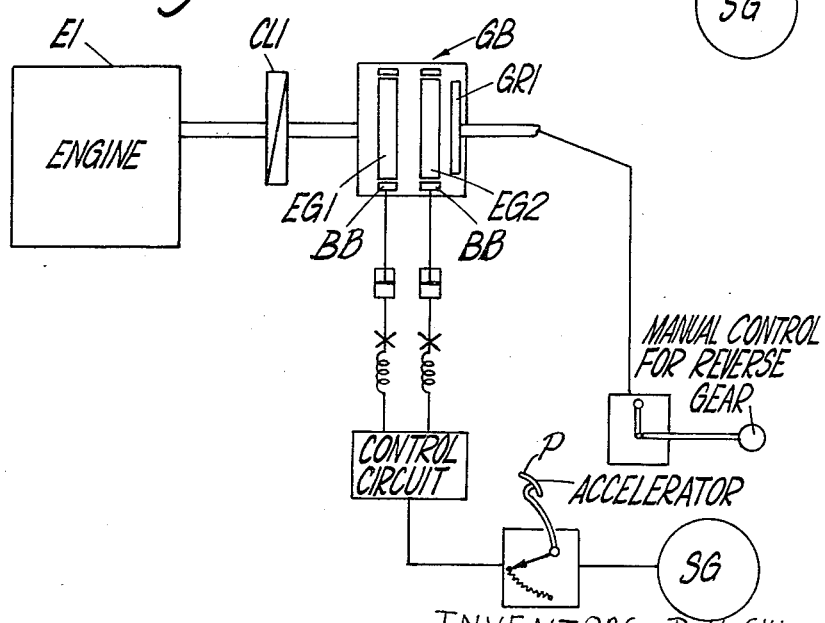

United States Patent Office 3,122,940
Patented Mar. 3, 1964

3,122,940
ELECTRICAL SELECTION APPARATUS
OR SYSTEMS
Rodney Haydn Shimwell and Edward Leyburn Robinson, London, England, assignors to Simms Motor Units Limited, London, England, a company of Great Britain
Filed Nov. 4, 1959, Ser. No. 850,804
Claims priority, application Great Britain Nov. 5, 1958
13 Claims. (Cl. 74—472)

The invention relates to electrical selection apparatus or systems and it is an object of the invention to provide an improved apparatus or system for electrical selection.

The invention provides apparatus for selectively energising any one of a plurality of electrically operated units from a source of electrical supply (e.g. to selectively engage one of the gears of a motor vehicle), which apparatus comprises a plurality of energising circuits associated respectively with the electrical units, each of which energising circuits comprises a transistor or other semi-conducting device, and selector means for selectively bringing into operation one of the energising circuits thereby to energise the selected electrical unit.

Preferably the selector means comprise means for rendering the transistor or other semi-conducting device in the energising circuit of the selected electrically operated unit conducting (or non-conducting) thereby to permit (or to prevent) current flow to the selected electrical unit.

Preferably the energising circuits comprise at least one bistable transistor device which is adapted to energise one of the units when it is in one of its stable states and adapted to energise another of the units when it is in the other of its stable states. The bistable device may also assume a condition in which neither of the said units is energised. Two such bistable devices may be energised alternatively through a third such bistable device, thereby to provide selective energisation of any one of four units.

Preferably the selector means comprise a series of two or more transistors arranged and adapted to be rendered conducting (or non-conducting) one after the other in accordance with variations in a potential which is indicative of the appropriate electrically operated unit to be selected thereby to bring into operation the energising circuits of the units one after the other. The arrangement is preferably such that when one energising circuit is brought into operation after another has been in operation, the other circuit is taken out of operation.

The invention also provides in or for a vehicle having a plurality of alternative gear trains for transmitting torque from the vehicle engine or motor to the propulsion member or members of the vehicle, which gear trains are associated with a plurality of electrically operated units for rendering the gear trains alternatively operative for transmitting torque, an automatic gear control system comprising a plurality of energising circuits associated respectively with the electrically operated units, each of which energising circuits comprises a controlling transistor or other semiconducting device, and means responsive to the running condition of the propulsion member or members for selectively rendering the transistor or other semi-conducting device in the energising circuit of the gear train appropriate to that running condition, conducting (or non-conducting) thereby to energize (or deenergize) the electrically operated unit controlling that gear train thereby automatically bringing the appropriate gear train into the transmission.

Preferably the automatic gear control system further comprises means responsive to the running condition of the engine or motor for selectively and separately rendering the transistor or other semi-conducting device in the gear train appropriate to slow running conditions of the propulsion member or members, conducting (or non-conducting), which means are automatically rendered operative when the propulsion member or members are stationary or when the propulsion members are running in a slow condition.

Preferably, the vehicle comprises a control member (e.g. an accelerator control) for controlling the running condition of the engine or motor (e.g. the ultimate rotational speed or the torque of the engine) and the means responsive to the running condition of the engine or motor comprises a selector switch operated by movement of the control member.

One specific construction of apparatus embodying the above and other features of the invention, and a modification thereof, will now be described by way of example with reference to the accompanying drawings, in which:

FIGURE 3 is a circuit diagram of the second example of this invention,

FIGURE 4 is a diagrammatic illustration of the first construction, and

FIGURE 5 is a diagrammatic illustration of the second construction.

The apparatus is embodied in a vehicle and provides a so-called automatic transmission therefor. The vehicle comprises a Wilson gear box consisting of a series of five alternative epicyclic gear trains, respectively providing, first, second, third, fourth and reverse gears, for transmitting torque from the vehicle engine to the driving wheels or propulsion members. The gear trains are selectively brought into use to obtain the selected gear ratio by locking the annulus gear of the appropriate gear train by means of a circular brake band. In this particular example, the gear box is air operated and each brake band B as shown in FIGURE 4 is tightened by movement of a piston AP working in a stationary cylinder and driven by compressed air.

Compressed air is metered to the five cylinders through five electrically operated air valves, each of which valves comprises an actuating solenoid. The solenoids are numbered R, 1, 2, 3 and 4 on the diagram and correspond to the five gears. When the solenoid associated with, say for example the second gear, that is solenoid 2, is energised, compressed air is supplied to the piston cylinder and unit associated with second gear and the second gear brake band is tightened thereby rendering second gear operative. Simultaneously, and as described in detail hereinafter, if first gear had been previously engaged, compressed air is released from the piston cylinder unit associated with first gear rendering that gear inoperative.

In this particular example a double switch S1 is provided within the reach of the driver which permits the actuating solenoids to be energised either under the driver's control, i.e. manually, or automatically in accordance with the running condition of the wheels or the engine. The switch has two alternative positions, in one of which a manual control circuit is completed and an automatic control circuit is interrupted, and in the other of which positions the manual circuit is interrupted and the automatic circuit is completed. For manual control a miniature gear lever G is provided, for example within reach of the driver's finger tips when he is holding the wheel, and by moving this gear lever to its five predetermined positions any of the five gear trains may be brought into operation. For convenience reverse gear cannot be brought into operation automatically and is always engaged manually by operation of the gear lever.

Figure 1:
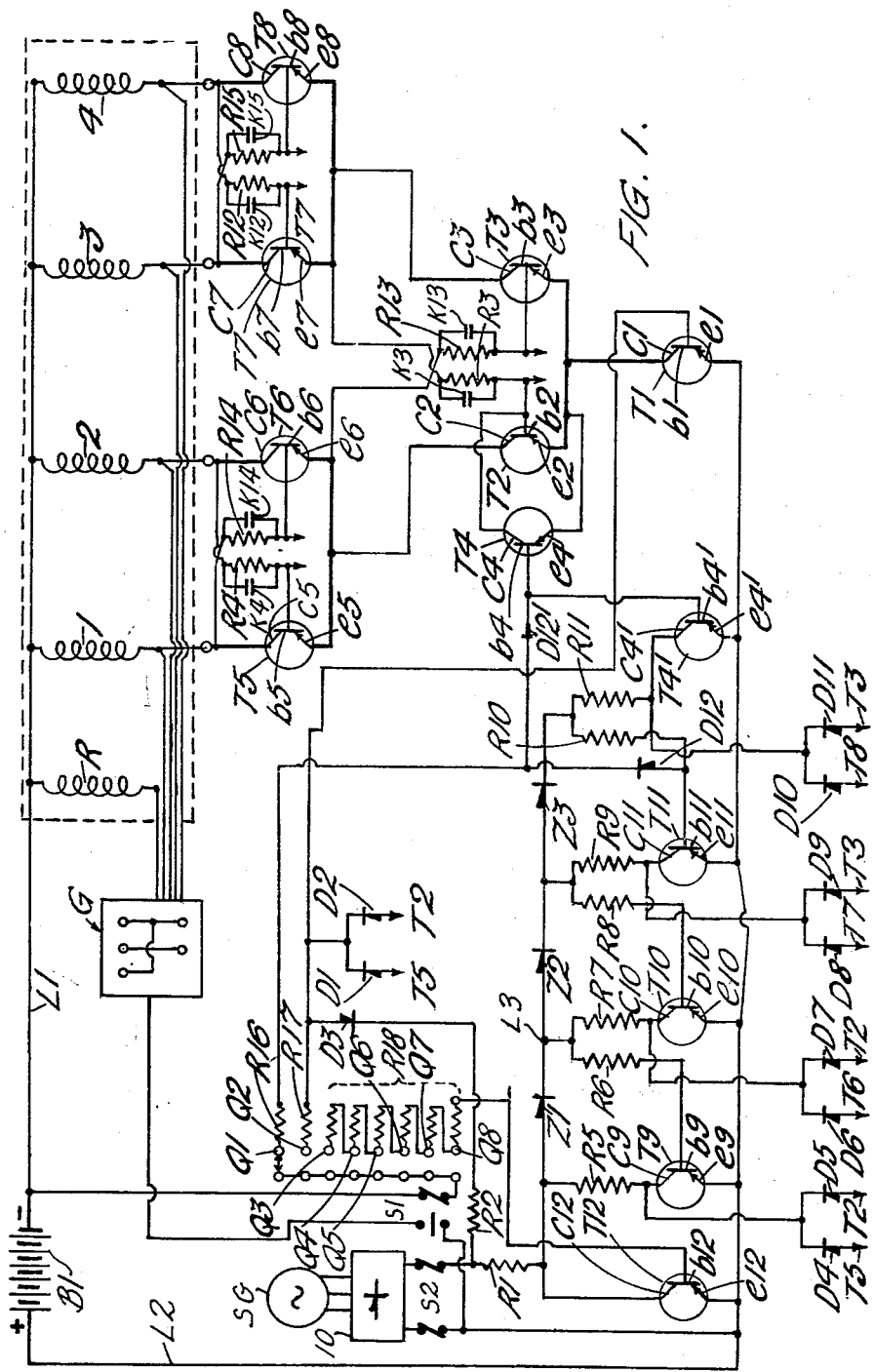
FIGURE 1 is a circuit diagram of the apparatus.

Automatic sequencing of the gears is effected by a control unit which is energised by two signals, one derived from the vehicle battery B1 and the other derived from a voltage generator SG, for example, a small permanent magnet alternator, driven from the output side of the gear box at a speed proportional to the vehicle road speed, that is at a speed dependent on the running condition of the driving wheels. The output is taken from the generator through a full wave rectifier 10 and a double switch S2 (as shown in FIGURE 1) is provided so that the generator can be isolated. The law of proportionality is preferably a logarithmic law so that a linear progression of speed signal is obtained from a geometrical progression of road speed. The magnitude of the signal derived from the battery is controlled by movement of the accelerator pedal and is therefore proportional to the effort demanded of the engine by the driver and hence to the running condition of the engine.

The accelerator pedal is arranged to operate a switch comprising a series of contacts, Q1, Q2, Q3 to Q8 to interconnect successively the contacts Q1, Q2, Q3 to Q8 as the pedal is depressed. A resistor R16 is connected in series with the contacts Q1, a resistor R17 is connected in series with the contact Q2, and a resistor R18 is connected in series with the contacts Q3 to Q8 as shown. The resistor R18 is connected to the base of transistor T12 which is connected in series with a resistor R1 in the output circuit of the rectifier 10 and the resistor R17 is connected through a semi-conductor diode D3 and resistor R2 to the negative side of the rectifier output circuit.

The control unit comprises a network of transistor and diodes which "gate" battery current to the appropriate actuating solenoid and which network comprises an interconnected arrangement of pairs of transistors arranged to form "saturation flip-flops" supervised or selectively rendered conducting by a diode gating system which is itself supervised by muting transistor.

First and second gears comprise a group of accelerating gears and third and fourth gears comprise a group of cruising gears. The actuating solenoids 1 and 2 for the accelerating gears are respectively energised through transistors T5, T6. The collectors c5 and c6 of those transistors are respectively connected to the solenoids 1 and 2, the bases b5, b6 are respectively connected to the solenoids 2 and 1 through parallel circuits comprising resistors R4 and capacitor K4, and resistor R14 and capacitor K14, and the emitters e5, e6 are interconnected. The transistors T5, T6 thus form a saturation flip-flop pair. Similarly the actuating solenoids 3 and 4 for the cruising gears are respectively energised through transistors T7, T8, the collectors c7, c8 of which are respectively connected to the actuating solenoids 3 and 4, the bases b7, b8 of which are respectively connected to the actuating solenoids 4 and 3 through parallel circuits comprising resistor R12 and capacitor K12, and resistor R15 and capacitor K15, and the emitters e7, e8 of which are interconnected. The transistors T7, T8 thus also form a saturation flip-flop pair.

The emitters e5, e6 and e7, e8 are respectively connected to the collectors c2, c3 of a further pair of transistors T2, T3, the emitters e2, e3 of which are interconnected and connected to the collector c1 of a further transistor T1. The bases b2, b3 of transistors T2, T3 are respectively connected to the flip flops of solenoids 3 and 2 through parallel circuits comprising resistor R3 and capacitor K3, and resistor R13 and capacitor K13 so that the transistors T2, T3, form a further saturation flip-flop pair.

The ends of the actuating solenoids R, 1, 2, 3 and 4 are connected by a common line L1 to the negative terminal of the vehicle battery B1 and the emitter e1 of transistor T1 is connected to the positive terminal of the vehicle battery by line L2. Thus, the solenoid 1 may be energised from the battery through an energising circuit comprising transistors T1, T2 and T5, solenoid 2 through an energising circuit comprising transistors T1, T2 and T6, solenoid 3 through an energising circuit comprising transistors T1, T3, and T7, and solenoid 4 through an energising circuit comprising transistors T1, T3 and T8.

The bases b4 and b4' of two further transistors T4, T4' are connected through a transistor diode D12' to the resistor R16, and the collector c4 and emitter e4 of the transistor T4 are connected respectively to the base b2 and the emitter e2 of the transistor T2. Thus, when a suitable signal is applied to the bases b4, b4' of transistor T4, T4' (by closing contacts Q1), those transistors are rendered conducting and the base b2 and emitter e2 of transistor T2 are interconnected through transistor T4 thereby preventing T2 from conducting and preventing the accelerating gears from being engaged. The resistor R16 is also connected through a semi-conductor diode D12 to the base b11 of a transistor T11 and when a suitable signal is applied to the base b11, that transistor is rendered conducting.

Since at this time transistors T4', T11 are both conducting no signal is applied to the bases of transistors T7, T3 through transistor diodes D8, D9 and no signal is applied to the bases of transistors T8, T3 through semi-conductor diodes D10, D11, the cruising gears are prevented from being engaged.

Second, third and fourth gears are engaged by feeding base current to the appropriate transistors through semi-conductor diodes D6, D7, D8, D9, D10 and D11 arranged in parallel pairs as shown and when first gear is engaged it is held engaged by feeding base current to the appropriate transistors through semi-conductor diodes D4, D5. The pairs of semi-conductor diodes D4, D5: D6, D7: D8, D9: D10, D11, are respectively connected to line L3 through resistors R5, R7, R9 and R11, the junction points in line L3 being separted by Zener diodes Z1, Z2 and Z3. The diode circuits are supervised by muting transistors T9, T10 and T11, the collectors of which are connected to the resistors R5, R7 and R9 and the emitters of which are connected to the positive battery line L2. The bases of transistors T9, T10 are respectively connected to the junctions between Zener diodes Z1, Z2 and Z2 and Z3 through resistors R6, R8 and the base of transistor T11 is connected to the junction between Zener diode Z3 and resistor R11 through resistor R10.

The sequence of operation from the standing position of the vehicle will now be described.

When the engine is started prepartory to driving away, the accelerator pedal is in its raised or relaxed position and the contacts Q1 are made. Consequently negative current is fed to the base of the transistor T4 through diode D12' which renders the transistor T4 conducting. The base and emitter of transistor T2 are therefore interconnected through the transistor T4 thereby preventing the transistor T2 from conducting and inhibiting engagement of first or second gear. Simultaneously, negative current is fed to the bases of the transistors T4', T11 thereby rendering those transistors conducting and preventing supply of base current to the transistors T3, T7 and T8 through diodes D8, D9, D10 and D11. Consequently engagement of third or fourth gear is also inhibited. This arrangement ensures that only neutral gear can be selected while the vehicle is stationary and the pedal relaxed. The engagement of other gears under these conditions would cause the engine to run against the load of the fluid flywheel, which would require more fuel than when running in neutral.

If the accelerator pedal is slowly depressed by the driver when he wishes to move away, contacts Q1 will be open and contacts Q2 will be made. When contacts Q1 are broken the supply of base current to transistors T4, T4' and T11 is interrupted and those transistors become non-conductive. When contacts Q2 are made base current is supplied to transistor T1 rendering that transistor conducting. Similarly base current is supplied to transistors T2 and T5 through bleed diodes D1 and D2 causing those two transistors to become conducting. Consequently an energising circuit for solenoid 1 is established from the positive terminal of the battery through line L2 and transistors T1, T2 and T5 thereby engaging first gear and causing the vehicle to move.

As soon as the vehicle begins to move a voltage is generated by generator SG and this voltage is applied through resistors R1, R2 and diode D3, to the base of transistor T1 and maintains that transistor conducting. Base current feed is obtained for transistor T2 to maintain it conducting through a parallel circuit comprising resistor R3 and capacitor K3 and solenoid 3 and that for transistor T5 through parallel circuit comprising resistor R4 and capacitor K4 and second gear solenoid 2. The base current feeds from these two sources are sufficient to bottom the transistors concerned so that a minimum of dissipation will occur at their collectors. Further the lower collector/emitter voltages of transistors T2 and T5 will inhibit operation of the other gear actuating solenoid. Transistors T2, T5 are held in a conducting state by base current fed to them from the line L2 through resistor R5 and diodes D4 and D5.

As the vehicle's speed increases and the accelerator pedal is further depressed contacts Q3 to Q8 will successively be made thereby varying the potential applied to the base of the transistor T12. This in turn will vary the potential of the junction between resistor R1 and line L3. When the potential at this junction reaches a certain value the Zener diode Z1 will conduct and base current will be fed to the transistors T6, T2 through resistor R7 and diodes D6, D7 thereby rendering transistor T6 conducting and maintaining transistor T2 in a conducting condition. Simultaneously base current will be supplied to the transistor T9 through resistor R6 thereby rendering the transistor T9 conducting and preventing base current being supplied to transistor T5 and T2 through diodes D4 and D5 by short circuiting them. Consequently, solenoid 2 is energised through transistors T6, T2 and T1 and second gear is engaged.

As the vehicle's speed is further increased the potential of the junction between resistor R1 and line L1 will further vary until a point is reached at which Zener diode Z2 becomes conducting. When this happens base current is fed to transistors T7 and T3, through resistor R9 and diodes D8, D9 thereby rendering those transistors conducting and establishing an energising circuit for solenoid 3 thereby energising third gear. Simultaneously, base current is fed to transistor T10 through resistor R8 rendering that transistor conducting and preventing base current being supplied to transistors T6, T2 through diodes D6, D7.

On further increase in the vehicle's speed, the potential of the junction between resistor R1 and line L3 will further vary until a point is reached when Zener diode Z3 also becomes conducting. When this happens base current is fed to transistors T8 and T3 through resistor R11 and diodes D10, D11 thereby rendering transistor T8 conducting and maintaining transistor T3 in this condition. Simultaneously, base current is fed to transistor T11 through resistor R10 thereby rendering that transistor conducting and preventing base current being supplied to transistors T7, T3 through diodes D8, D9.

If at any time due to an upward incline the vehicle's speed falls sufficiently for more efficient operation in a lower gear, the output of the generator SG and hence of the rectifier 10 will fall and the potential of the junction between resistor R1 and line L3 will consequently vary until it reaches a potential at which the Zener diode Z3 ceases to conduct and the system reverts to the third gear engagement.

Unless provision is made to avoid it, each time the driver releases the accelerator pedal, regardless of the vehicle's speed, the gear system would revert to neutral gear. This would happen since the gear system must be capable of being changed from neutral to first gear, in the first instance, in response to the movement of the accelerator pedal only since the generator SG produces no voltage when the vehicle is stationary. This is avoided in the present circuit by the provision of the diode D3 and resistor R2. The components also enable a cruising gear to be engaged automatically should the driver allow the vehicle to roll or coast down an incline or hill.

If, when the vehicle is operating in third or fourth gear, the accelerator pedal is released, base current is applied to the transistors T4 and T4' through contacts Q1. The transistor T4 therefore becomes conducting and short circuits any signal to the transistor T2. This in turn inhibits a change into second or first gear and the cruising gear is maintained to near standstill when the gear box will drop into neutral with the de-excitation of the neutral control transistor T1. If power is required at any time during coasting, depression of the accelerator pedal will break the circuit to transistor T4 and the correct gear will be automatically selected immediately.

The multiple contacts Q1 to Q8 operated by depression of the accelerator pedal, will, at extreme and high depressions, make contacts which route battery current through the selected part of resistor R18 to the base of transistor T12 in the output circuit of the generator SG. Current drawn by this transistor from the generator will produce a voltage drop in the series resistor R1 which will, in turn, reduce the potential of the junction between resistor R1 and line L3. This, in turn, will enable higher engine speeds and powers to be obtained in any gear and consequently greater acceleration of the vehicle in proportion to the increase in horse power delivered by the engine. In extreme cases, for example, on full depression of the accelerator pedal, this may be accompanied by a change down in gear followed by an up change in gear when the vehicle speed has been increased. Should the generator SG fail to generate a voltage for any reason whatsoever, the gear system will revert to neutral since no base current will be supplied to transistor T1 and none of the gears can be engaged.

Values for the various circuit components in the foregoing example have not yet been fully ascertained but the following values may be taken as indicative of likely values:

| Resistors: | Kilohms |
|---|---|
| R1 | 1 |
| R2 | 2.2 |
| R3 | 3.3 |
| R4 | 3.3 |
| R5 | 2.2 |
| R6 | 6.8 |
| R7 | 2.2 |
| R8 | 6.8 |
| R9 | 2.2 |
| R10 | 6.8 |
| R11 | 2.2 |
| R12 | 3.3 |
| R13 | 3.3 |
| R14 | 3.3 |
| R15 | 3.3 |

Capacitors: Micro-farads
- K4 _____ 2
- K12 _____ 2
- K13 _____ 2
- K14 _____ 2
- K15 _____ 2

Transistors:
- T1 _____ Clevite 2N268.
- T2 _____ Clevite 2N268.
- T3 _____ Clevite 2N268.
- T4 _____ Intermetal OC307.
- T4′ _____ Intermetal OC307.
- T5 _____ Mullard Type O.C.16.
- T6 _____ Mullard Type O.C.16.
- T7 _____ Mullard Type O.C.16.
- T8 _____ Mullard Type O.C.16.
- T9 _____ Mullard Type OC72.
- T10 _____ Mullard Type OC72.
- T11 _____ Mullard Type OC72.
- T12 _____ Mullard Type 2N268.

Diodes:
- D1 _____ Mullard Type OA10.
- D2 _____ Mullard Type OA10.
- D3 _____ Mullard Type OA10.
- D4 _____ Mullard Type OA10.
- D5 _____ Mullard Type OA10.
- D6 _____ Mullard Type OA10.
- D7 _____ Mullard Type OA10.
- D8 _____ Mullard Type OA10.
- D9 _____ Mullard Type OA10.
- D10 _____ Mullard Type OA10.
- D11 _____ Mullard Type OA10.
- D12 _____ Mullard Type OA10.
- D12′ _____ Mullard Type OA10.

Rectifiers:
- Z1 _____ Intermetal Z6.
- Z2 _____ Intermetal Z6.
- Z3 _____ Intermetal Z6.

In the foregoing example the cut-out condition, that is the point at which the system reverts to neutral, is fixed by the release of the appropriate solenoid under a steadily decreasing excitation or base current. If the supply of base current to the transistor T1 is controlled by a pair of transistors forming an unbalanced flip-flop transistor pair, this drop out point can be made to occur suddenly. An automatic gear control system embodying an unbalanced flip-flop transistor pair is shown in the accompanying drawing, referred to herein as FIGURE 2, which is a circuit diagram.

Figure 2:
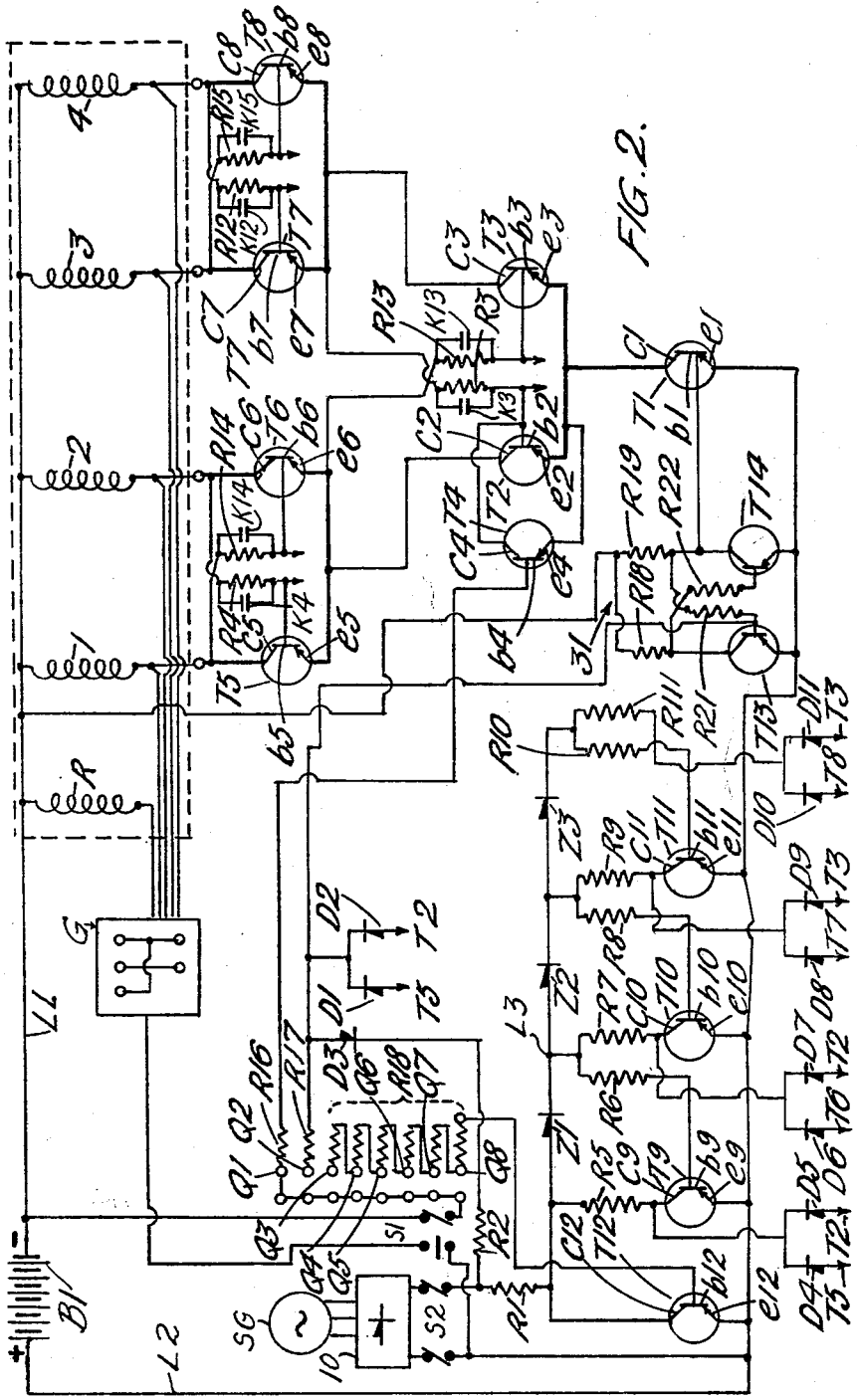
FIGURE 2 is a circuit diagram of the modified apparatus.

The circuit shown in FIGURE 2 is a modification of that shown in FIGURE 1 and corresponding electrical components have been identified by similar references. In FIGURE 2, the flip-flop pair 31 replaces the transistor T4′ of FIGURE 1 and comprises two transistors T13, T14 (Intermetal OC37) the collectors of which are connected together through resistors R18, R19 (3.3 kilo-ohms) and to the negative line L3. The base of transistor T13 is connected to the collector of transistor T14 through resistor R21 (6.8 kilo-ohms) and the base of transistor T14 is connected to the collector of transistor T13 through resistor R22 (6.8 kilo-ohms). The base of transistor T13 is further connected to the resistor R17 through resistor R18.

If, when the vehicle is operating in third or fourth gear, the accelerator pedal is released, base current is applied to the transistor T4 through contacts Q1. The transistor T4 therefore becomes conductive and short circuits any signal to the transistor T2 as in the first example and inhibits a change into second or first gear. While the vehicle is cruising at a sufficiently high speed base current will be supplied to the transistor T13 through the diode D3 maintaining that transistor conducting. However, as the vehicle speed decreases, the voltages generated by the generator SG will decrease and at a particular vehicle speed the diode D3 will become non-conducting. When this occurs the supply of base current to the transistor T13 will be interrupted and that transistor will become non-conducting. Simultaneously the transistor T14 will become conducting and the base of transistor T1 taken positive. Transistor T1 will therefore become non-conducting and the system will revert to neutral.

In the second example, the circuit diagram of which is shown in FIGURE 3, the aparatus is also embodied in a vehicle and again provides a so-called automatic transmission therefor. The vehicle comprises a gear box for transmitting torque from the vehicle engine to the driving wheels or propulsion members through a fluid flywheel or other suitable clutch. The gear box GB comprises two epicyclic gear trains EG1, EG2 and a reverse gear train GR1, the two epicyclic gear trains being selectively brought into use to obtain the selected gear ratio by locking the annulus gear of the appropriate gear train by means of a circular brake band B1. A first combination of the gear trains EG1, EG2 gives first gear, locking the annulus of one gear train gives second gear, locking the annulus of the other gear gives third gear and a second combination of the gear trains EG1, EG2 gives fourth gear. As in the first example, the gear box is air operated and each brake band is tightened by movement of a piston working in a stationary cylinder and driven by compressed air. The gear box in the second example differs from the Wilson gear box, in that it does not comprise a neutral gear and when the vehicle is at rest, the gear box engages first gear causing the clutch to overrun. Reverse gear is engaged manually by the driver of the vehicle.

Compressed air is metered to the two cylinders through two electrically operated air valves, each of which valves comprises an actuating solenoid numbered A, B in FIGURE 3. The solenoids A, B are respectively energised through energising circuit comprising transistor $T_A$, $T_B$ from the vehicle battery through lines L1 and L2, line L1 being the negative line. When the solenoid A is energised along second gear is engaged, when the solenoid B is energised alone third gear is engaged and when the solenoids A and B are energised together, fourth gear is engaged.

The selector circuit for the transistors $T_A$, $T_B$ comprise controlling transistors TC1, TC2, TC3, driver transistors TD1, TD2, TD3, holding transistors H1, H2, H3 and resistors R24, R25, R26, R27, R28, R29, R33, R34, R35, R36, R37, R38 connected as shown. Base current for the transistors TD1, TD2, TD3 is derived from the junction between resistor R30 in the emitter circuit of a transistor $T_R$ and the emitter of that transistor and is fed to the bases of transistors TD1, TD2, TD3 through resistors R25, R26, R28. The transistor TR is controlled by the output of the generator SG through a rectifier XI and as the speed of the generator increases the base current of the transistor TR also increases. The values of the resistors R25, R26, R28 are selected so that the transistor TD1 is rendered conducting when the output of the generator reaches a value at which it is necessary to change from first to second gear, so that the transistor TD2 is rendered conducting when the output of the generator reaches a value at which it is necessary to change into third gear, transistor TD1 being rendered non-conducting as hereinafter described to disengage second gear, and so that the transistor TD3 is rendered conducting when the output of the generator reaches a value at which it is necessary to change into top or fourth gear, transistor TD2 being maintained conducting.

Negative base current for the transistor $T_A$, is derived from the negative line L1 alternatively through the circuit comprising resistor R31 and diode D11 or through the circuit comprising resistor R32 and diode D13.

These alternative circuits are controlled from the transistors TC1, TC3 through lines L5, L6. Negative base current for the transistor $T_B$ is derived through the circuit comprising resistor R41 and diode D12, which circuit is controlled from the transistor TC2 through line L7.

The emitters of transistors H1, H2, H3 are connected to a line L4 which is connected to the collector of transistor TR and to a variable tapping of a resistor R40 connected to one side of the generator. The tapping is moved along the resistor R40 as the vehicle accelerator pedal P is moved and consequently the impedance of the generator circuit is varied as the pedal is moved. The collectors of the transistors TD1, H1; TD2H2; TD3, H3 are respectively connected to the bases of transistors TC1, TC2, TC3 and are connected to the negative line L1 through resistors R21, R22, R23 as shown. Resistors R41, R42 are respectively connected between the bases and emitters of transistors $T_A$, $T_B$ and a transistor $T_C$ is connected between the lines L1, L2 through a resistor R22 as shown. Base current for the transistor $T_C$ is derived through resistor R21.

When the vehicle engine is started and before the vehicle moves, the power transistors $T_A$, $T_B$ will each be held in a non-conducting condition since the change transistors TC1, TC2, TC3 will be held in a conducting condition by the negative current derived from the line L1 through the resistors R21, R22, R23. Under these conditions the transistors TD1, TD2, TD3 will each be held in a non-conducting condition by the potential dividers comprising resistors R24, R25; R26, R29, R28, R27 connected between the positive line L2 and the line L3.

When the accelerator pedal P is depressed the engine speed will increase and the vehicle will move away. As the engine speed increases, the output of the generator SG increases causing an increase in the base current of transistor TR. The potential across the resistor R30 will therefore be changed and the potential of the line L3 will also be changed. This change is such that the potential applied to the base of the transistor TD1 reaches a value at which the transistor TD1 becomes conducting. When the transistor TD1 becomes conducting, the base and emitter of the transistor TC1 are interconnected through the transistor TD1 thereby preventing the transistor TC1 from conducting. When the transistor TC1 becomes non-conducting, the low resistance path through that transistor to the negative line L1 from the junction resistor R31 and diode D11' will be interrupted and negative base current will be supplied to the base of transistor $T_A$ through resistor R31 and diode D11'. Consequently, the transistor $T_A$ will become conducting and the solenoid A will be energised causing engagement of second gear.

When the transistor TC1 becomes non-conducting, the potential of the junctions between resistor R33 and resistor R34, and between resistor R34 and resistor R24 change. The variation in potential of the junction between R24, R33 is applied to the base of transistor TD1 and is in a sense such as to make the transistor TD1 more conducting. The variation in potential of the junction between R33, R34 tends to make transistor H1 conducting.

When the accelerator pedal P is further depressed the engine speed will also increase causing a further change in the potential of the line L3 until the potential applied to the base of the transistor TD2 causes that transistor to become conducting. When the transistor TD2 becomes conducting, the base and emitter of the transistor TC2 are interconnected through the transistor TD2 thereby preventing the transistor TC2 from conduction. When the transistor TC2 becomes non-conducting, the low resistance path through that transistor to the negative line L1 through resistor R49 will be interrupted and negative base current will be supplied to the base of transistor $T_B$ through resistor R49 and diode D12. Consequently, the transistor $T_B$ will become conducting and the solenoid B will be energised causing engagement of third gear.

When the transistor TC2 is rendered non-conducting, negative base current is supplied to the base of the cross transfer transistor T1 rendering that transistor conducting. When the transistor T1 is conducting a low resistance path is established between the transistor $T_A$ and the positive line is re-established thereby rendering the transistor $T_A$ non-conducting and de-energising the solenoid A and causing second gear to drop out. When the solenoid A is energised, energy is stored in its associated magnetic field and when the transistor $T_A$ is rendered non-conducting a circulating current is established through the diode D14 which acts as a low resistance. This current is dissipated in the winding of the solenoid.

When the transistor TC2 becomes non-conducting, the base current flowing in the transistor H2 increases and consequently the potential of the junctions between resistor R35 and resistor R36 and between resistor R29 and resistor R35 changes. The variation in potential of the junction between R29, R35 is applied to the base of transistor TD2 and is in a sense such as to make the transistor TD2 more conducting. The variation in potential of the junction between R35, R36 tends to make transistor H2 conducting.

When the accelerator pedal is further depressed to increase the engine speed still further, the potential of the line L3 will change until the potential applied to the base of the transistor TD3 causes that transistor to become conducting. When the transistor TD3 becomes conducting, the base and emitter of the transistor TC3 are interconnected thereby preventing the transistor TC3 from conducting. When the transistor TC3 becomes non-conducting the low resistance path through that transistor to the negative line L1 will be interrupted and negative base current will be supplied to the base of transistor $T_A$ through resistor R32 and diode D13. Consequently under these conditions solenoids A, B are both energised simultaneously and fourth gear is engaged.

When the transistor TC3 becomes non-conducting, the base current flowing in the transistor H3 increases and consequently the potential of the junctions between resistors R37, R38 and between resistors R27, R37 change. The change of potential of the junction between R27, R37 is applied to the base of transistor TD3 and is in a sense such as to make the transistor TD3 more conducting. The variation in potential of the junction between R37, R38 tends to make H3 conducting.

If at any time when the vehicle is in top gear, the vehicle speed falls sufficiently for more efficient operation in a lower gear, the output of the generator SG will fall and the potential of the junction between resistor R30 and the emitter of transistor $T_R$ will vary until it reaches a value at which transistor TD3 is cut-off. When this occurs, the transistor $T_A$ will be rendered non-conducting thereby disengaging top gear and reengaging third gear. Similarly on a further decrease in generator output second and first gears will be successively engaged. When the solenoid B is energised, energy is stored in its associated magnetic field (as in the case of solenoid A). A diode D15 is provided so that when the transistor $T_B$ is rendered non-conducting a circulating current is established through the diode D15 which acts as a low resistance. This current is dissipated in the winding of the solenoid B.

Consider now that the vehicle is in top gear and the driver relaxes the pedal. As the pedal is relaxed the tapping moves back over the resistor R40 decreasing the impedance of the generator circuit. When the pedal reaches its raised position the contact Q is made and the line L2 is connected to the emitters of transistors H1, H2, H3. Consequently the transistors H1, H2, H3 which have their bases at a potential such that they tend to be conducting, become conducting and hold top gear engaged.

Typical values for the various resistive circuit components in the second example are:

Resistors:
| | | |
|---|---|---:|
| R21 | ohms | 4,200 |
| R22 | do | 4,700 |
| R23 | do | 4,700 |
| R24 | do | 2,200 |
| R25 | do | 1,000 |
| R26 | do | 6,800 |
| R27 | do | 2,200 |
| R28 | do | 12,000 |
| R29 | do | 2,200 |
| R31 | do | 220 |
| R32 | do | 220 |
| R33 | do | 15,000 |
| R34 | do | 13,000 |
| R35 | do | 15,000 |
| R36 | do | 18,000 |
| R37 | do | 15,000 |
| R38 | do | 18,000 |
| R41 | kilo-ohms | 33 |
| R42 | do | 33 |
| R49 | ohms | 220 |

We claim:

1. An automatic gear control system for a vehicle having a plurality of alternative gear trains for transmitting torque from the vehicle engine to the propulsion members of the vehicle, which control system comprises a plurality of electrically-operated means associated respectively with the plurality of gear trains for rendering the gear trains alternatively operative for transmitting torque, a plurality of power transistors respectively connected in series with the electrically-operated means, a current source for supplying current to the series circuits comprising said electrically-operated means and said power transistors when said transistors conduct, a plurality of control transistors respectively controlling the supply of base current to the said power transistors, means for producing a potential indicative of the appropriate gear train to be engaged, and means for rendering the control transistors conducting one after another in accordance with variations in the said potential thereby to engage automatically the appropriate gear train.

2. An automatic gear control system as claimed in claim 1, in which the means for producing the said potential comprise a monitoring transistor, a variable resistor, said variable resistor being included in the base supply circuit of said monitoring transistor, a manually operable control member for varying the resistance of the variable resistor thereby to vary the base current to the monitoring transistor, an electrical load induced in the emitter circuit of the said monitoring transistor and an electrical generator for providing an output indicative of the running condition of the engine and providing a current through the said electrical load whereby the potential developed across the electrical load is indicative of the appropriate gear train to be engaged.

3. An automatic gear control system as claimed in claim 2, in which said electrical generator is connected in the emitter/collector circuit of said monitoring transistor.

4. An automatic gear control system as claimed in claim 3, in which the means for rendering the control transistors conducting one after another comprise a series of Zener diodes, a Zener diode being connected between the collectors of each consecutive two control transistors, the collector of the first control transistor being connected to the collector of the monitoring transistor and the emitters of the control transistors being connected to the emitter of the monitoring transistor.

5. An automatic gear control system as claimed in claim 1, in which the means for producing the said potential comprise a monitoring transistor, a variable resistor, a manually operable control member for varying the resistance of the variable resistor, an electrical load, and an electrical generator for providing an output indicative of the running condition of the engine, said variable resistor and said generator being included in the emitter/base circuit of the monitoring transistor whereby the potential developed across the electrical load is indicative of the appropriate gear train to be engaged.

6. An automatic gear control system as claimed in claim 5, in which the means for rendering the control transistors conducting one after another comprises a series of potentiometers connected in parallel with the said electrical load, the tappings of the potentiometers being connected respectively to the bases of the control transistors.

7. An automatic gear control system for a vehicle having a plurality of alternative gear trains for transmitting torque from the vehicle engine to the propulsion members of the vehicle, which control system comprises in combination, a current source, a plurality of electrically-operated means associated respectively with the plurality of gear trains for rendering the gear trains alternatively operative for transmitting torque, a plurality of energizing circuits associated respectively with the electrically-operated means, each of which energizing circuits comprises a control transistor and which energizing circuits are connected to the current source so that when the transistor in an aforesaid energizing circuit is in one condition, the electrically-operated means in that circuit is energized and when that transistor is in another condition those means are de-energized, and means responsive to the running condition of the propulsion member for selectively bringing the transistors to their said one condition thereby to energize the electrically-operated means and automatically to engage the appropriate gear train.

8. An automatic gear control system as claimed in claim 7, in which the selector means are such that the energizing circuits can be brought into operation individually thereby to energize the electrically-operated means individually.

9. An automatic gear control system as claimed in claim 8, in which the selector means are such that two of the energizing circuits can be brought into operation together thereby to energize two of the electrically-operated means simultaneously.

10. An automatic gear control system for a vehicle having a plurality of alternative gear trains for transmitting torque from the vehicle engine to the propulsion members of the vehicle, which control system comprises in combination, a current source, a plurality of electrically-operated means associated respectively with the plurality of gear trains for rendering the gear trains alternatively operative for transmitting torque, a plurality of energizing circuits associated respectively with the electrically-operated means, each of which energizing circuits comprises a control transistor and which energizing circuits are connected to the current source so that when the transistor in an aforesaid energizing circuit conducts, current is supplied to the electrically-operated means in that circuit, an electrical generator driven from the engine and providing an output indicative of the running condition of the engine, and selector means for selectively rendering the control transistors conducting, said selector means comprising a plurality of auxiliary transistors respectively associated with the control transistors, arranged and adapted to be rendered conducting one after the other in accordance with variations in a potential dependent on the output of the generator and indicative of the electrical unit to be selected, and respectively arranged and adapted to route base current to their associated control transistors when conducting.

11. An automatic gear control system as claimed in claim 10, in which the selector means further comprises a plurality of Zener diodes respectively associated with the auxiliary transistors, the Zener diodes becoming conducting one after another as the said potential increases and thereby rendering the auxiliary transistors conducting one after the other.

12. An automatic gear control system as claimed in claim 11, in which the selector means further comprise a plurality of resistors respectively controlling the base currents of the auxiliary transistors and energized in accordance with the said potential.

13. An automatic gear control system for a vehicle having a plurality of alternative gear trains for transmitting torque from the vehicle engine to the propulsion members of the vehicle, which gear trains are associated with a plurality of electrically-operated means for rendering the gear trains alternatively operative for transmitting torque, which control system comprises in combination, a current source, a plurality of energizing circuits associated respectively with the electrically-operated means, each of which energizing circuits comprises a control transistor and which energizing circuits are connected to the current source so that when the transistor in an aforesaid energizing circuit conducts, current is supplied to the electrically-operated means in that circuit, and selector means responsive to the running condition of the propulsion member for selectively rendering the transistors conducting thereby to energize the electrically-operated means controlling the gear train appropriate to the running condition of the propulsion members, said selector means comprising a variable resistor, a manually operable control member for varying the resistance of the variable resistor, a monitor transistor the base circuit of which includes the said variable resistor, an electrical load included in the emitter circuit of said monitor transistor, and an electrical generator providing an output indicative of the running condition of the engine and providing a current through the said electrical load, a series of at least two auxiliary transistors respectively associated with the control transistors, arranged and adapted to be rendered conducting one after another in accordance with variations in the potential developed across the said electrical load and respectively arranged and adapted to route base current to their associated control transistors when conducting.

References Cited in the file of this patent

UNITED STATES PATENTS

| | | |
|---|---|---|
| 2,881,625 | Hodkin | Apr. 14, 1959 |
| 2,891,411 | Sutherland et al. | June 23, 1959 |
| 2,913,918 | Gill | Nov. 24, 1959 |
| 2,922,311 | Lucien et al. | Jan. 26, 1960 |